United States Patent
Tanaami et al.

(10) Patent No.: US 12,263,557 B2
(45) Date of Patent: Apr. 1, 2025

(54) AUTOMATIC POLISHING SYSTEM AND AUTOMATIC POLISHING DEVICE

(71) Applicant: SINTOKOGIO, LTD., Nagoya (JP)

(72) Inventors: Yoshikane Tanaami, Nagoya (JP); Koji Ito, Nagoya (JP); Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 574 days.

(21) Appl. No.: 17/495,231

(22) Filed: Oct. 6, 2021

(65) Prior Publication Data
US 2022/0118584 A1   Apr. 21, 2022

(30) Foreign Application Priority Data
Oct. 16, 2020 (JP) ................. 2020-174931

(51) Int. Cl.
*B24B 51/00* (2006.01)
*B24B 7/10* (2006.01)
(Continued)

(52) U.S. Cl.
CPC ............ *B24B 51/00* (2013.01); *B24B 7/10* (2013.01); *B24B 29/02* (2013.01); *B24B 49/12* (2013.01);
(Continued)

(58) Field of Classification Search
CPC ....... B24B 51/00; B24B 27/0038; B24B 7/10; B24B 29/02; B24B 49/00; B24B 49/16;
(Continued)

(56) References Cited

U.S. PATENT DOCUMENTS

| | | | | |
|---|---|---|---|---|
| 4,523,409 A | * | 6/1985 | De Fazio | ................ B24B 19/26 901/44 |
| 5,394,654 A | * | 3/1995 | Shimbara | ................ B24B 27/04 451/6 |

(Continued)

FOREIGN PATENT DOCUMENTS

| | | |
|---|---|---|
| JP | H03-142159 A | 6/1991 |
| JP | 05-220656 | 8/1993 |

(Continued)

OTHER PUBLICATIONS

JP H0816225 A English Translation (Year: 1996).*
(Continued)

*Primary Examiner* — Makena S Markman
(74) *Attorney, Agent, or Firm* — Harness, Dickey & Pierce, P.L.C.

(57) ABSTRACT

Provided is an automatic polishing system that is capable of adjusting a degree of polishing in accordance with a condition of a surface of a body of a mobile object. The automatic polishing system includes: a multi-articulated robot; a polishing machine including a spindle that spins around an axis and a polishing tool that is fixed at an end of the spindle; a sensor which is provided between the multi-articulated robot and the polishing machine and which detects normal reaction (z-axis component $F_z$) that acts from a polish target surface to the polishing machine and moment (z-axis component $M_z$) that acts around the axis of the spindle; and a control unit which controls the multi-articulated robot based on the normal reaction (z-axis component $F_z$) and the moment (z-axis component $M_z$).

2 Claims, 5 Drawing Sheets

Figure 1:
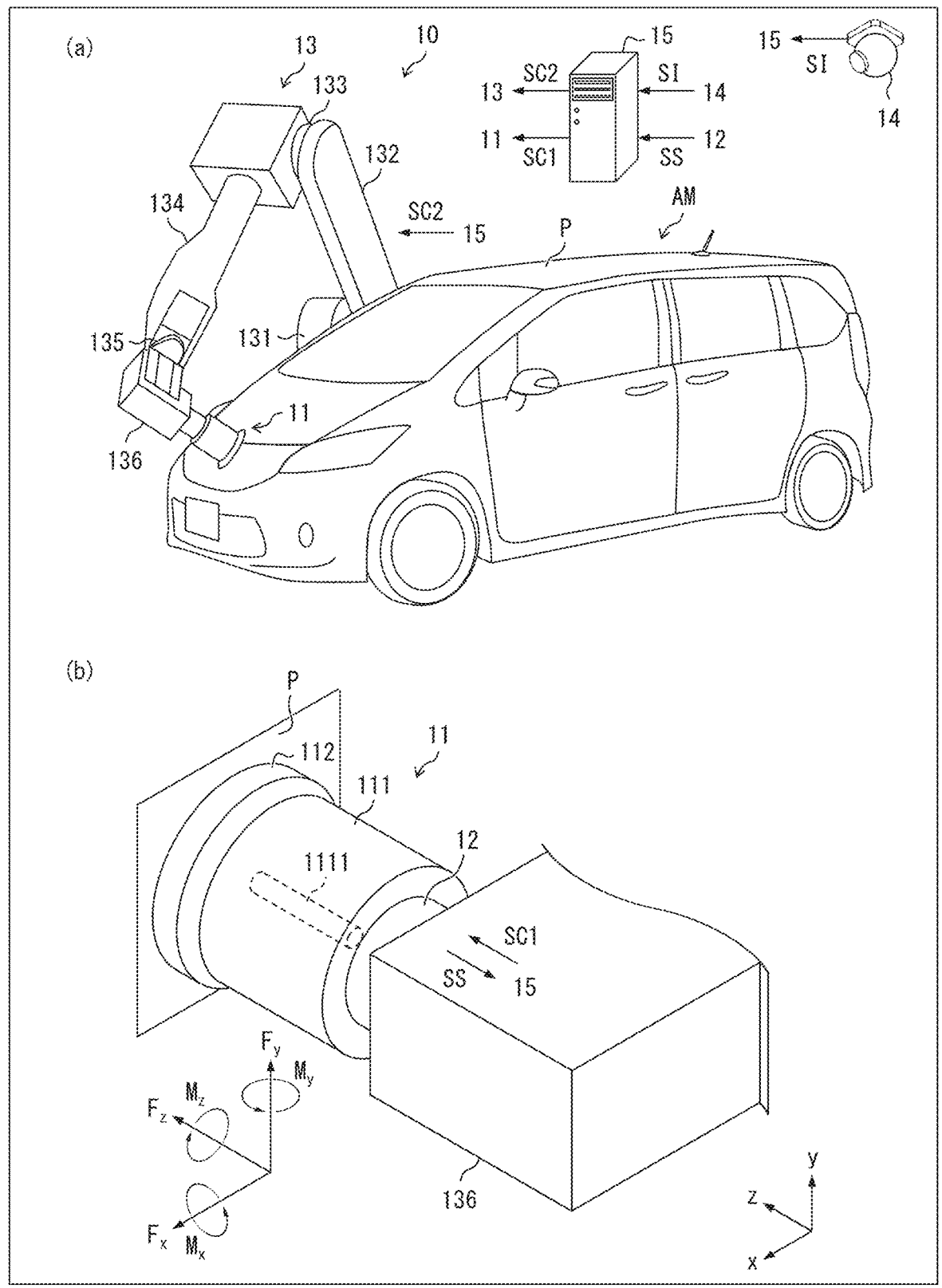

(51) Int. Cl.
  *B24B 29/02* (2006.01)
  *B24B 49/00* (2012.01)
  *B24B 49/12* (2006.01)
  *B25J 11/00* (2006.01)
  *B60S 5/00* (2006.01)

(52) U.S. Cl.
  CPC ........... *B25J 11/0065* (2013.01); *B24B 49/00* (2013.01); *B60S 5/00* (2013.01)

(58) Field of Classification Search
  CPC ......... B24B 49/12; B60S 5/00; B25J 11/0065; B25J 9/1633; B25J 13/085
  See application file for complete search history.

(56) References Cited

U.S. PATENT DOCUMENTS

| | | | | |
|---|---|---|---|---|
| 5,509,848 | A | * | 4/1996 | Shimbara ............... B25J 9/1684 451/24 |
| 8,914,153 | B2 | * | 12/2014 | Vila Papell ............ B25J 9/1684 700/258 |
| 9,342,066 | B2 | * | 5/2016 | Shimodaira ............ B25J 9/1694 |
| 10,150,199 | B2 | * | 12/2018 | Bonnet ................... B24B 49/16 |
| 10,669,462 | B2 | * | 6/2020 | Yamada ................ C09K 3/1409 |
| 11,534,924 | B1 | * | 12/2022 | Alspaugh ............... B64U 80/10 |
| 2005/0159840 | A1 | * | 7/2005 | Lin ..................... G05B 19/4163 700/245 |
| 2012/0220194 | A1 | * | 8/2012 | Maloney ................. B24B 37/30 451/5 |
| 2017/0282325 | A1 | * | 10/2017 | Takahashi ............. B24B 37/046 |
| 2022/0126319 | A1 | * | 4/2022 | Richardson ........ G05B 13/0265 |

FOREIGN PATENT DOCUMENTS

| | | | |
|---|---|---|---|
| JP | H0816225 A | * | 1/1996 |
| JP | 09-262752 A | | 10/1997 |
| JP | 2011-041992 A | | 3/2011 |
| WO | 2020/161534 A1 | | 8/2020 |

OTHER PUBLICATIONS

Japanese Office Action for Japanese Application No. 2020-174931 and English translation thereof dated Apr. 2, 2024.
Japanese Office Action for Japanese Application No. 2020-174931 and English translation thereof dated Jun. 18, 2024.

* cited by examiner

AUTOMATIC POLISHING SYSTEM AND AUTOMATIC POLISHING DEVICE

This Nonprovisional application claims priority under 35 U.S.C. § 119 on Patent Application No. 2020-174931 filed in Japan on Oct. 16, 2020, the entire contents of which are hereby incorporated by reference.

TECHNICAL FIELD

The present invention relates to an automatic polishing system and an automatic polishing device.

BACKGROUND ART

In order to keep an aesthetic appearance of an automobile with least labor, a technique of coating, with a protective layer, a paint film surface on a body constituting the automobile has been widely employed. The protective layer is obtained by coating the paint film surface with a glass-based material or a polymeric material which is in a liquid form and then drying the material.

In such coating with the protective layer, quality of a finish depends on smoothness of the paint film surface. Therefore, in order to heighten the smoothness of the paint film surface, the paint film surface is often polished before the coating is applied. Moreover, the surface of the protective layer after coating is often polished to further improve the finish after coating.

The polishing of the paint film surface and the surface of the protective layer is often carried out empirically by skilled artisans. However, in view of shortage of successors of artisans, demand for cost reduction in coating, and the like, automation of those polishing processes is desired. For example, Patent Literature 1 discloses a technique for automatically polishing a paint film surface of a body by a polishing machine (buffing machine in Patent Literature 1) in which the polishing is carried out while maintaining constant normal reaction (pressing load in Patent Literature 1) generated when the polishing machine is pressed against the paint film.

CITATION LIST

Patent Literature

Patent Literature 1
Japanese Patent Application Publication Tokukai No. 1997-262752

SUMMARY OF INVENTION

Technical Problem

However, in the technique disclosed in Patent Literature 1, although polishing can be carried out while maintaining the constant normal reaction, a degree of polishing cannot be changed in accordance with a condition (e.g., smoothness) of the paint film surface or the protective layer surface. Therefore, in the technique disclosed in Patent Literature 1, it is not assumed that the degree of polishing is changed in accordance with the condition of the paint film surface or the protection layer surface, and it seems that the entire area of the paint film surface or the protective layer surface is polished at a constant degree. That is, in the technique disclosed in Patent Literature 1, it seems that a speed at which the polishing machine carrying out buffing is moved on the paint film surface or the protective layer surface is kept constant.

As a result, insufficient polishing may occur in some areas of the paint film surface or the protective layer surface that have a worse condition as compared with the other areas. In addition, in a case where the speed at which the polishing machine is moved is set to be low in accordance with some areas in which the condition is worse than that in the other areas, excessive polishing is carried out in those other areas, and a time taken for polishing per unit becomes unnecessarily long.

An aspect of the present invention is accomplished in view of the problems, and its object is to provide a technique capable of adjusting a degree of polishing to be applied to a surface of a body of a mobile object in accordance with a condition of the surface.

Solution to Problem

In order to attain the object, an automatic polishing system in accordance with an aspect of the present invention includes an automatic polishing device and a control unit. The automatic polishing device includes the following (1) through (3):

(1) A multi-articulated robot.
(2) A polishing machine which is provided at an end part of the multi-articulated robot. The polishing machine includes a spindle that spins around an axis and a polishing tool that is fixed at an end of the spindle.
(3) A sensor which is provided between the end part and the polishing machine. The sensor outputs normal reaction force information hereinafter also referred to as normal reaction information (which is information indicative of normal reaction that acts from a polish target surface to the polishing machine) and torque information hereinafter also referred to as moment information (which is information indicative of moment that acts around the axis of the spindle).

Moreover, the control unit obtains the normal reaction information and the moment information to control the multi-articulated robot based on the normal reaction and the moment.

In order to attain the object, an automatic polishing device in accordance with an aspect of the present invention includes: (1) a multi-articulated robot; (2) a polishing machine which is provided at an end part of the multi-articulated robot and which includes a spindle that spins around an axis and a polishing tool that is fixed at an end of the spindle; and (3) a sensor which is provided between the end part and the polishing machine and which outputs normal reaction information indicative of normal reaction that acts from a polish target surface to the polishing machine and moment information indicative of moment around the spindle.

Advantageous Effects of Invention

According to an aspect of the present invention, it is possible to provide the automatic polishing system that is capable of adjusting a degree of polishing to be applied to a surface of a body of a mobile object in accordance with a condition of the surface.

BRIEF DESCRIPTION OF DRAWINGS (a) of FIG. 1 is a schematic diagram illustrating an automatic polishing system in accordance with an embodiment of the present invention. (b) of FIG. 1 is a perspective view illustrating a polishing machine and a sensor included in the automatic polishing system illustrated in (a) of FIG. 1.

Figure 2:
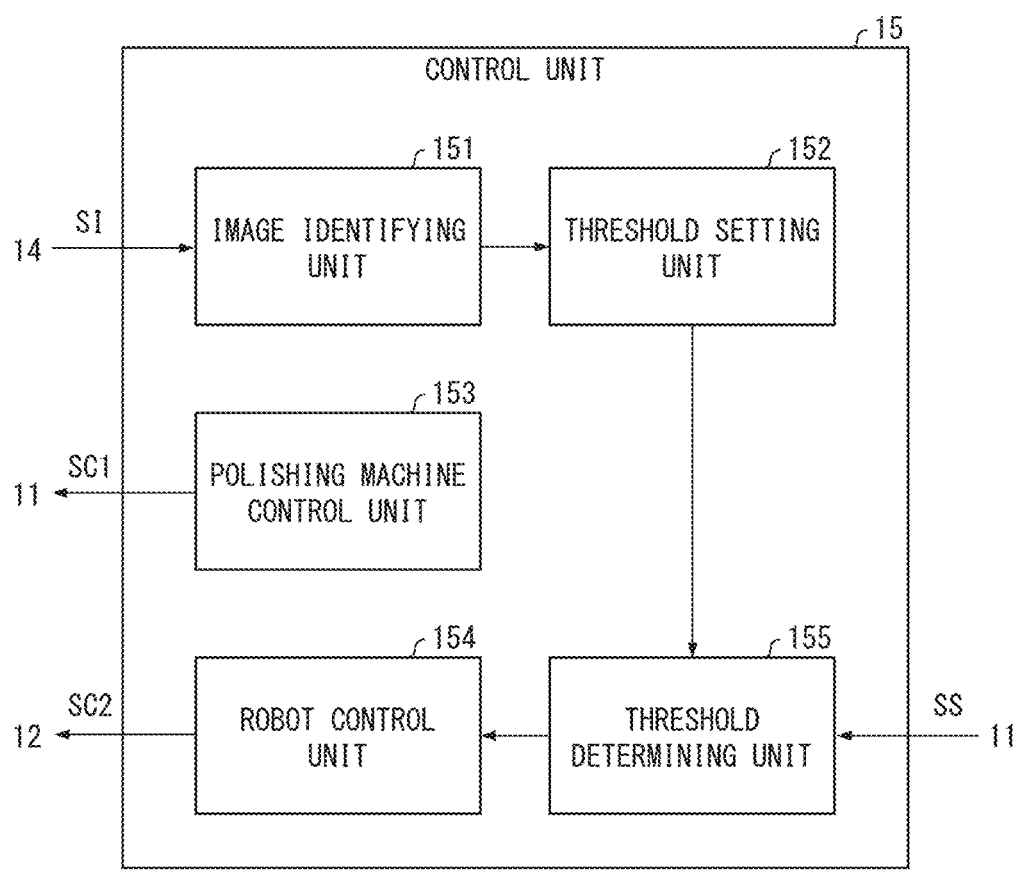

FIG. 2 is a block diagram illustrating a control unit included in the automatic polishing system illustrated in (a) of FIG. 1.

Figure 3:
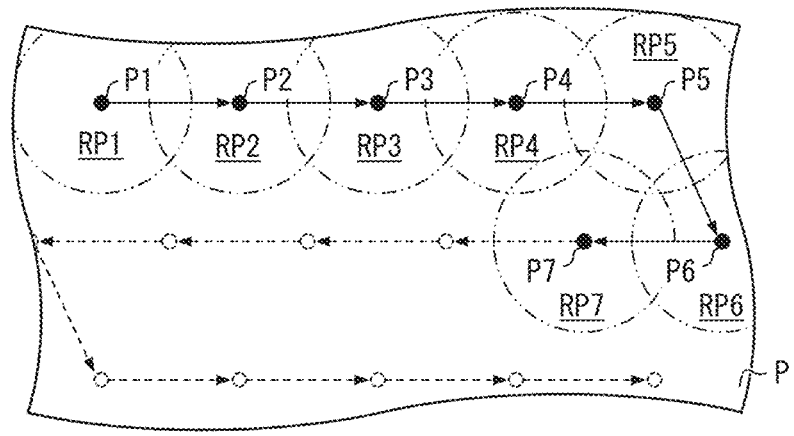
Figure 3:
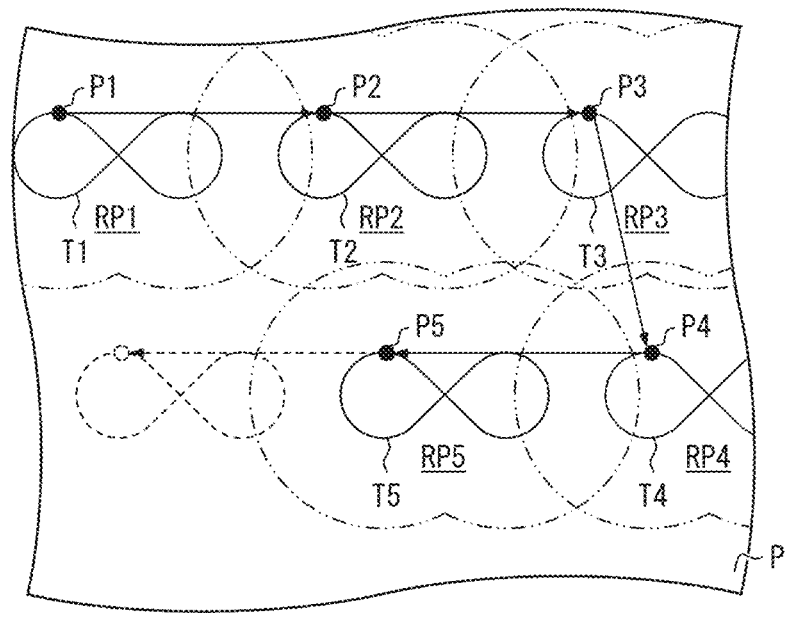

(a) of FIG. 3 is a plan view illustrating a polish target surface to be polished by the automatic polishing system illustrated in (a) of FIG. 1, showing a track of a spindle and polish regions. (b) of FIG. 3 is a plan view illustrating a polish target surface to be polished by a modification example of the automatic polishing system illustrated in (a) of FIG. 1, showing a track of a spindle and polish regions.

Figure 4:
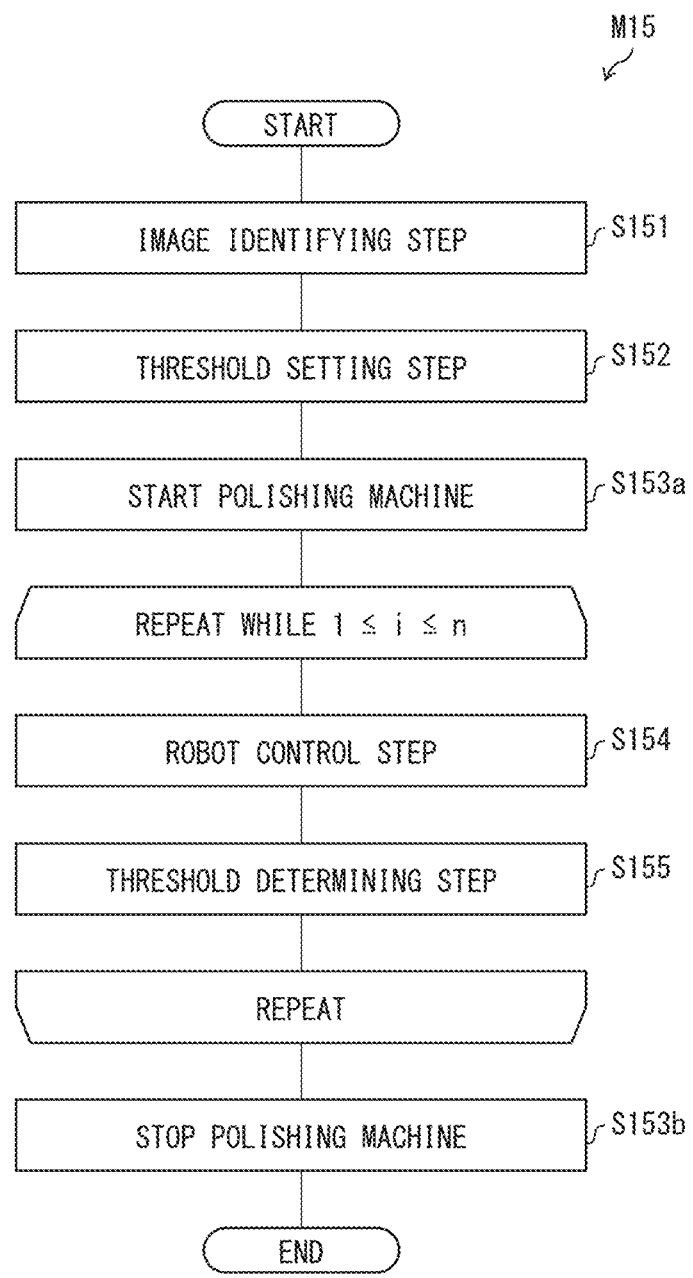

(a) of FIG. 4 is a flowchart showing an automatic polishing method in accordance with an embodiment of the present invention.

Figure 5:
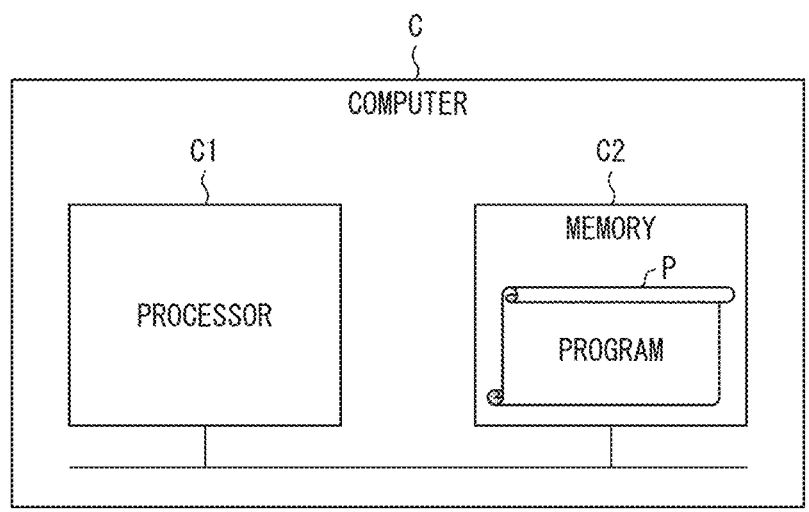

FIG. 5 is a block diagram illustrating a configuration of a computer functioning as a control unit included in the automatic polishing system illustrated in (a) of FIG. 1.

DESCRIPTION OF EMBODIMENTS

[Configuration of Automatic Polishing System]

The following description will discuss a configuration of an automatic polishing system 10 in accordance with an embodiment of the present invention with reference to FIG. 1. (a) of FIG. 1 is a schematic diagram illustrating the automatic polishing system 10. (b) of FIG. 1 is a perspective view illustrating a polishing machine 11 and a sensor 12 included in the automatic polishing system 10.

As illustrated in (a) of FIG. 1, the automatic polishing system 10 includes a polishing machine 11, a sensor 12, a multi-articulated robot 13, a camera 14, and a control unit 15. Note that the polishing machine 11, the sensor 12, and the multi-articulated robot 13 constitute an automatic polishing device which is an aspect of the present invention.

In the present embodiment, the automatic polishing system 10 includes one automatic polishing device. However, the automatic polishing system 10 can include a plurality of automatic polishing devices.

The automatic polishing system 10 automatically polishes a polish target surface, which is a surface of a body of a mobile object, by computer control. In the present embodiment, the automatic polishing system 10 will be described with reference to, as an exemplary mobile object, an automobile AM which is a private vehicle. Note, however, that the mobile object is not limited to the automobile AM, and can be a large automobile such as a bus or a truck, or can be an airplane or a train. A body panel P which is made of a steel plate and constitutes the surface of the automobile AM is an example of the polish target surface.

In a case where the mobile object is an automobile, the automatic polishing system 10 can be suitably used to polish a paint film surface of a body constituting the automobile as a preliminary process of coating the paint film surface of the body with a protective layer. The automatic polishing system 10 can also be suitably used for finish polishing carried out after coating the paint film surface of the body with the protective layer.

Moreover, in a case where the mobile object is an airplane or a train, the body can be repainted or the body can be lapped using a cutting sheet to change a design of the body. The automatic polishing system 10 can be suitably used to polish the surface of the body as a process preliminary to repainting or lapping of the body.

<Multi-Articulated Robot>

The multi-articulated robot 13 illustrated in (a) of FIG. 1 is an aspect of an industrial robot, also called a vertical multi-articulated robot. The multi-articulated robot 13 includes a base portion (fixed to the ground), a first joint 131 provided on the base portion, a first arm 132, a second joint 133, a second arm 134, a third joint 135, and a third arm 136.

The base portion is fixed to the ground in a state rotatable about a rotation axis which is an axis perpendicular to the ground. In (a) of FIG. 1, the base portion is hidden by the automobile AM and is not illustrated. The base portion is provided with the first joint 131.

To the first joint 131, one end of the first arm 132 is connected. By the movement of the first joint 131, an angle formed by the first arm 132 and the ground can be changed.

To the other end of the first arm 132, one end of the second arm 134 is connected via the second joint 133. By the movement of the second joint 133, an angle formed by the second arm 134 and the first arm 132 can be changed.

To the other end of the second arm 134, one end of the third arm 136 is connected via the third joint 135. By the movement of the third joint 135, an angle formed by the third arm 136 and the second arm 134 can be changed.

Moreover, the third joint 135 is configured such that the third arm 136 can be rotated about a rotation axis which is an axis (x-axis shown in (b) of FIG. 1) that is parallel to a direction from one end to the other end of the third arm 136.

As illustrated in (b) of FIG. 1, the third arm 136 is a rectangular parallelepiped-shaped block and constitutes an end part of the multi-articulated robot 13.

Each of the first joint 131, the second joint 133, and the third joint 135 operates based on a control signal SC2 generated by the control unit 15 (described later). That is, the multi-articulated robot 13 is controlled by the control signals SC2.

<Polishing Machine>

As illustrated in (b) of FIG. 1, the polishing machine 11 includes a main body 111 and a polishing tool 112 (which is a buff in the present embodiment). The main body 111 includes a motor and a spindle 1111 driven by the motor. The spindle 1111 is a columnar member, and rotates about a rotational axis which is a central axis thereof. The spindle 1111 is provided so as to protrude from one end surface of the main body 111 which has the columnar shape.

The other end surface of the main body 111 is fixed, via the sensor 12 (described later), to one of the four side surfaces constituting the third arm 136.

In (b) of FIG. 1, the z-axis is defined so as to be parallel to the central axis of the spindle 1111; the x-axis is defined so as to be parallel to sides extending from one end to the other end of the third arm 136 among sides constituting the rectangular parallelepiped-shaped block constituting the third arm 136; and the y-axis is defined so as to constitute an orthogonal coordinate system of the right-handed system together with the x-axis and the z-axis. Further, a direction from the third arm 136 to the polishing tool 112 in the z-axis direction is defined as the positive z-axis direction; a direction from one end to the other end of the third arm 136 in the x-axis direction is defined as the positive x-axis direction; and the positive y-axis direction is defined so as to constitute an orthogonal coordinate system of the right-handed system together with the positive x-axis direction and the positive z-axis direction.

The polishing tool 112 is a disk-shaped abrasive material made of felt, cotton, and/or the like. In the present embodiment, when the polishing tool 112 is viewed in the plan view, the contour of the polishing tool 112 is a circular shape. A material constituting the polishing tool 112, roughness of the material, and the like are not limited, and can be appropriately selected in accordance with a material (e.g., paint film) constituting the polish target surface. The polishing tool 112 is fixed to the tip of the spindle 1111 so that a center of the polishing tool 112 substantially coincides with the central axis of the spindle 1111.

The polishing machine 11 rotates the polishing tool 112 by rotating the spindle 1111. By pressing the polishing surface of the polishing tool 112 against the body panel P while rotating the spindle 1111, the polishing machine 11 polishes the body panel P.

The main body 111 of the polishing machine 11 obtains a control signal SC1 generated by the control unit 15 (described later), and controls the motor based on the control signal SC1 to rotate the spindle 1111. That is, the rotation speed of the polishing tool 112 is controlled by the control signal SC1.

<Sensor>

The sensor 12 is provided so as to be interposed between the side surface of the third arm 136 constituting the end part of the multi-articulated robot 13 and the polishing machine 11.

In the present embodiment, the sensor 12 is a 6-axis force sensor. Therefore, when the polishing tool 112 is pressed against the body panel P while the spindle 1111 is rotating about the axis, (1) an x-axis component $F_x$, a y-axis component $F_y$, and a z-axis component $F_z$ of translation force F acting on the polishing machine 11 from the body panel P, and (2) an x-axis component $M_x$, a y-axis component $M_y$, and a z-axis component $M_z$ of moment M acting on the polishing machine 11 from the body panel P, are detected. In addition, the sensor 12 outputs first force information, second force information, and third force information respectively representing the x-axis component $F_x$, the y-axis component $F_y$, and the z-axis component $F_z$, and first moment information, second moment information, and third moment information respectively representing the x-axis component $M_x$, the y-axis component $M_y$, and the z-axis component $M_z$ to the control unit 15 (described later). In the following description, the x-axis component $F_x$, the y-axis component $F_y$, the z-axis component $F_z$, the x-axis component $M_x$, the y-axis component $M_y$, and the z-axis component $M_z$ are collectively referred to as "sensor information SS".

The z-axis component $F_z$ is an example of normal reaction that acts on the polishing machine 11 from the body panel P, and is synonymous with pressing load with which the polishing machine 11 is pressed against the body panel P. Therefore, by controlling the multi-articulated robot 13 so that the z-axis component $F_z$ falls within a predetermined range, the pressing load can be kept substantially constant. The third force information is an example of normal reaction information.

The z-axis component $M_z$ is an example of moment acting around the axis of the spindle 1111, and can be used as an index for evaluating frictional resistance generated between the body panel P and the polishing machine 11. In a case where the body panel P is polished using the polishing machine 11, the z-axis component $M_z$ decreases as polishing of the body panel P proceeds. Therefore, by monitoring the z-axis component $M_z$ during the polishing and terminating the polishing when the z-axis component $M_z$ becomes a predetermined threshold or less, it is possible to adjust the degree of polishing in accordance with the condition of the body panel P. The third moment information is an example of moment information indicative of the moment acting around the axis of the spindle 1111.

Each of the x-axis component $F_x$ and the y-axis component $F_y$ increases in a case where a projecting obstacle (e.g., a door knob) exists on the surface of the body panel P when the polishing machine 11 is moved on the surface of the body panel P while the polishing machine 11 is pressed against the body panel P. By controlling the multi-articulated robot 13 so that each of the x-axis component $F_x$ and the y-axis component $F_y$ falls within the predetermined range, the polishing machine 11 can be moved while avoiding the projecting obstacle.

Each of the x-axis component $M_x$ and the y-axis component $M_y$ increases in a case where the inclination of the surface of the body panel P is changed when the polishing machine 11 is moved on the surface of the body panel P while the polishing machine 11 is pressed against the body panel P. By controlling the multi-articulated robot 13 so that each of the x-axis component $M_x$ and the y-axis component $M_y$ falls within the predetermined range, the polishing machine 11 can be moved while following the body panel P. By controlling the multi-articulated robot 13 so that each of the x-axis component $M_x$ and the y-axis component $M_y$ falls within the predetermined range, the polishing machine 11 can be moved while the central axis (z-axis indicated in (b) of FIG. 1) of the spindle 1111 substantially accords with the normal direction of the body panel P.

In an embodiment of the present invention, the sensor 12 only needs to be a 2-axis force sensor that outputs at least the third force information indicating the z-axis component $F_z$ and the third moment information indicating the z-axis component $M_z$.

<Camera>

The camera 14 is a digital camera for outputting information indicating a captured image. In the present embodiment, the camera 14 captures an image including the automobile AM that has entered a polishing space in which the automatic polishing system 10 carries out automatic polishing, outputs image information SI indicating the image, and supplies the image information SI to the control unit 15 (described later).

<Control Unit>

The control unit 15 is a feature for controlling operation of the automatic polishing system 10. The control unit 15 obtains the sensor information SS generated by the polishing machine 11, and controls the multi-articulated robot 13 in accordance with the z-axis component $F_z$ indicated by the third force information included in the sensor information SS and the z-axis component $M_z$ indicated by the third moment information included in the sensor information SS. Hereinafter, functional blocks constituting the control unit 15 will be described with reference to FIGS. 2 and 3. FIG. 2 is a block diagram illustrating the control unit 15. (a) of FIG. 3 is a plan view illustrating the body panel P to be polished by the automatic polishing system 10, and indicates, on a polish target surface, a track of the spindle 1111 and polish regions RPi (where i is a natural number of 1≤i≤n, where n is any positive integer). (b) of FIG. 3 is a plan view illustrating the body panel P to be polished by a modification example of the automatic polishing system 10, and indicates, on a polish target surface, a track of the spindle 1111 and polish regions RP1 through RP7.

As illustrated in FIG. 2, the control unit 15 includes an image identifying unit 151, a threshold setting unit 152, a polishing machine control unit 153, a robot control unit 154, and a threshold determining unit 155.

(Image Identifying Unit)

The image identifying unit 151 obtains image information SI from the camera 14. The image identifying unit 151 identifies a manufacturer, a vehicle type name, and a body color of the automobile AM included in an image indicated by the image information SI, and generates automobile information indicating the manufacturer, the vehicle type name, and the body color of the identified automobile AM. The image identifying unit 151 outputs the automobile information to the threshold setting unit 152.

(Threshold Setting Unit)

The threshold setting unit 152 obtains automobile information from the image identifying unit 151. The threshold setting unit 152 sets a threshold for the z-axis component $M_z$ in accordance with the manufacturer, the vehicle type, and the body color of the automobile AM indicated by the automobile information. In the present embodiment, the threshold setting unit 152 refers to a look-up table (LUT) in which each automobile specified by the manufacturer, the vehicle type name, and the body color is associated with a threshold unique to that automobile, and sets a threshold for the automobile AM based on the LUT. The threshold setting unit 152 generates threshold information indicating the threshold for the automobile AM, and outputs the threshold information to the threshold determining unit 155.

The LUT can be configured to associate each automobile specified by at least any of the manufacturer, the vehicle type name, and the body color with a threshold unique to that automobile. For example, in a case where the LUT is configured to associate each body color with a unique threshold, the threshold setting unit 152 is to set a threshold in accordance with the body color of the automobile AM. In a case where it is not necessary to set a threshold for each automobile, the threshold can be set in advance, and the threshold setting unit 152 can be omitted.

The threshold can be set by using a trained model prepared by machine learning. In this case, for example, a trained model can be used to which the manufacturer, the vehicle type, and the body color of the automobile AM are input, and which outputs a threshold suitable for the automobile AM. Alternatively, it is possible to employ a configuration in which, in addition to those inputs, or instead of those inputs, a coating condition of the automobile AM (e.g., surface roughness of a paint film, a glossiness index, a thickness of a paint film, and the like) is input to the trained model. Alternatively, it is possible to employ a trained model to which an image including the automobile AM as a subject (i.e., an image indicated by image information SI) is input and which outputs a threshold suitable for the automobile AM. This makes it possible to set an optimal threshold, while taking into consideration the manufacturer, the vehicle type, the body color, and the coating condition of the automobile AM. In this case, identification of the manufacturer, the vehicle type, and the body color by the image identifying unit 151 can be omitted.

The z-axis component $M_z$ correlates with frictional resistance generated between the polishing surface of the polishing tool 112 and the polish region RPi of the body panel P. Therefore, the z-axis component $M_z$ may vary depending on an abrasion degree of the polishing surface of the polishing tool 112, even in a case where the polish region RPi is polished with the constant z-axis component $F_z$. In the automatic polishing system 10, it is possible to evaluate the abrasion degree of the polishing surface of the polishing tool 112 with use of a reference surface prior to starting polishing of the body panel P. The reference surface is a surface finished to have predetermined surface roughness (which is an index representing smoothness) and glossiness index (e.g., glossiness, cloudiness, image clarity, bidirectional reflectance distribution function (BRDF), and the like), and imitates a surface of a body panel of an automobile. The abrasion degree of the polishing surface of the polishing tool 112 can be evaluated by monitoring the z-axis component $M_z$ while the spindle 1111 is rotated under the same condition as when the polish region RPi is actually polished and controlling the multi-articulated robot 13 so that the z-axis component $F_z$ falls within the predetermined range. In a case where the abrasion degree of the polishing surface is evaluated, the threshold setting unit 152 can be configured to correct, depending on the evaluation result, a threshold for the automobile AM set based on the LUT. According to the configuration, even in a case where the abrasion degree of the polishing surface of the polishing tool 112 varies, it is possible to reduce unevenness that can occur in a finish of the body panel P after the automatic polishing system 10 carries out polishing.

(Polishing Machine Control Unit)

The polishing machine control unit 153 generates a control signal SC1 for controlling the polishing machine 11, and outputs the control signal SC1 to the polishing machine 11. The control signal SC1 includes a control signal for turning on and off a power source for the motor of the polishing machine 11, and a control signal for controlling a rotation speed of the motor (i.e., a rotation speed of the spindle 1111).

(Robot Control Unit)

The robot control unit 154 generates a control signal SC2 for controlling the multi-articulated robot 13 and outputs the control signal SC2 to the multi-articulated robot 13. The multi-articulated robot 13 that has obtained the control signal SC2 moves the first joint 131, the second joint 133, and the third joint 135 in accordance with the control signal SC2. As a result, the multi-articulated robot 13 can arbitrarily control a position of the spindle 1111 of the polishing machine 11 in the body panel P and the z-axis component $F_z$ (i.e., the pressing load with which the polishing machine 11 is pressed against the body panel P). Note that the position of the spindle 1111 of the polishing machine 11 in the body panel P means a position obtained by projecting the central axis of the spindle 1111 onto the surface of the body panel P. Further, in the following description, a position of the spindle 1111 in the body panel P is also simply referred to as the position of the spindle 1111.

The robot control unit 154 obtains the z-axis component $F_z$ from the polishing machine 11 while the polishing machine 11 is polishing polish regions RPi (where i is a natural number of 1≤i≤n, where n is any positive integer) each of which is the predetermined region of the body panel P. In addition, the robot control unit 154 controls the multi-articulated robot 13 so that the z-axis component $F_z$ falls within the predetermined range. As a result, the pressing load is kept substantially constant during the polishing period.

In the example illustrated in (a) of FIG. 3, the robot control unit 154 first controls the multi-articulated robot 13 so that the position of the spindle 1111 coincides with a point P1 which is a start point of polishing. The point P1 is the center of the polish region RP1. The radius of the polish region RP1 is substantially identical with that of the polishing tool 112. In this regard, each of the polish regions RPi and each of points Pi are the same as the polish region RP1 and the point P1, respectively.

The robot control unit 154 fixes the position of the spindle 1111 at the point P1 until the robot control unit 154 obtains polish completion information indicating that polishing has been completed from the threshold determining unit 155 (described later).

When the robot control unit 154 has obtained polish completion information from the threshold determining unit 155, the robot control unit 154 moves the position of the spindle 1111 from the point P1 to the point P2. Consequently, the polishing machine 11 polishes the polish region RP2.

As described above, the robot control unit 154 repeats the processes of moving the spindle 1111 to a predetermined position (in (a) of FIG. 3, points P1 through P7) and fixing the spindle 1111 at each of predetermined positions (i.e., the points P1 through P7) while the polishing machine 11 is polishing the body panel P, as long as i is 1 or more and n or less.

The robot control unit 154 can be configured to control the multi-articulated robot 13 so that the position of the spindle 1111 draws a cyclic track in each of the polish regions RPi while the polishing machine 11 is polishing the body panel P (see (b) of FIG. 3). In the example illustrated in (b) of FIG. 3, the robot control unit 154 controls the multi-articulated robot 13 so that the central axis of the spindle 1111 draws a track of "cc".

(Threshold Determining Unit)

The threshold determining unit 155 obtains the z-axis component $M_z$ from the polishing machine 11 while the polishing machine 11 is polishing polish regions RPi each of which is the predetermined region of the body panel P. The threshold determining unit 155 obtains threshold information indicating a threshold for the automobile AM from the threshold setting unit 152. In addition, the threshold determining unit 155 compares the z-axis component $M_z$ with the threshold indicated by the threshold information and, when the z-axis component $M_z$ is less than or equal to the threshold, the threshold determining unit 155 determines that polishing of the polish region RPi has been completed. At this time, the threshold determining unit 155 outputs polish completion information indicating that polishing of the polish region RPi has been completed to the robot control unit 154.

The threshold determining unit 155 repeats this process as long as i is 1 or more and n or less.

In a case where the robot control unit 154 is configured such that the position of the spindle 1111 draws a cyclic track in each of the polish regions RPi (see (b) of FIG. 3), the threshold determining unit 155 can determine that polishing of the polish region RPi has been completed when a maximum value in one cycle of the z-axis component $M_z$ is equal to or less than the threshold.

<Automatic Polishing Method>

The following description will discuss an automatic polishing method M15 carried out by the control unit 15 in the automatic polishing system 10, with reference to FIG. 4. FIG. 4 is a flowchart showing the automatic polishing method M15.

As shown in FIG. 4, the automatic polishing method M15 includes an image identifying step S151, a threshold setting step S152, a polishing machine starting step S153a, a robot control step S154, a threshold determining step S155, and a polishing machine stopping step S153b.

The image identifying step S151 is a process carried out by the image identifying unit 151 illustrated in FIG. 2. In the image identifying step S151, a manufacturer, a vehicle type name, and a body color of the automobile AM included in an image indicated by the image information SI are identified, and automobile information indicating the manufacturer, the vehicle type name, and the body color of the identified automobile AM is generated.

The threshold setting step S152 is a process carried out by the threshold setting unit 152 illustrated in FIG. 2. In the threshold setting step S152, a threshold for the z-axis component $M_z$ is set in accordance with the manufacturer, the vehicle type name, and the body color of the automobile AM indicated by the automobile information.

The polishing machine starting step S153a and the polishing machine stopping step S153b are processes carried out by the polishing machine control unit 153 illustrated in FIG. 2.

The robot control step S154 is a process carried out by the robot control unit 154 illustrated in FIG. 2. In the robot control step S154, the z-axis component $F_z$ is obtained from the polishing machine 11 while the polishing machine 11 is polishing polish regions RPi each of which is the predetermined region of the body panel P. In addition, the robot control unit 154 controls the multi-articulated robot so that the z-axis component $F_z$ falls within the predetermined range.

Further, in the robot control step S154, the position of the spindle 1111 is moved to the point P1 which is the start point of polishing. Then, the robot control unit 154 fixes the position of the spindle 1111 at the point P1 until polishing of the polish region RP1 is completed.

The threshold determining step S155 is a process carried out by the threshold determining unit 155 illustrated in FIG. 2. In the threshold determining step S155, the z-axis component $M_z$ is compared with the threshold indicated by the threshold information while the polishing machine 11 is polishing the polish region RPi and, when the z-axis component $M_z$ is less than or equal to the threshold, it is determined that polishing of the polish region RPi has been completed.

In the automatic polishing method M15, as long as i is 1 or more and n or less, the robot control step S154 and the threshold determining step S155 are sequentially repeated. Moreover, when i exceeds n, the polishing machine stopping step S153b is carried out, and the automatic polishing method M15 thus ends.

(Example of Control Unit Achieved by Software)

One or some of or all of the functions of the control unit 15 can be realized by hardware such as an integrated circuit (IC chip) or can be alternatively realized by software. In the latter case, the functions of the control unit 15 are realized by, for example, a computer that executes instructions of a program P that is software.

FIG. 5 illustrates an example of such a computer (hereinafter, referred to as "computer C"). As illustrated in FIG. 5, the computer C includes at least one processor C1 and at least one memory C2. The memory C2 stores the program P for causing the computer C to function as the control unit 15. In the computer C, the processor C1 reads the program P from the memory C2 and executes the program P, so that the functions of the control unit 15 are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C can further include a communication interface for carrying out transmission and reception of data with other devices. The computer C can further include an input-output interface for connecting input devices such as a keyboard and a mouse and/or output devices such as a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

Aspects of the present invention can also be expressed as follows:

According to the automatic polishing system in accordance with an aspect of the present invention, it is possible to adjust a degree of polishing to be applied to a polish target surface in accordance with a condition of the polish target surface. Note that an example of the polish target surface includes a surface of a body of a mobile object. According to another embodiment, it is possible to surely adjust a degree of polishing to be applied to the polish target surface. According to another embodiment, it is possible to automatically set a threshold in accordance with a manufacturer, a vehicle type, and a color of an automobile to be polished. According to another embodiment, the spindle continues to move so as to draw a cyclic track while the polishing machine is polishing a predetermined region in the polish target surface, and it is therefore possible to reduce a polish trace that may remain on the polish target surface. According to another embodiment, it is possible to provide a system which automatically polishes, with use of a simple configuration, a polish target surface while following the shape of the polish target surface. According to another embodiment, it is possible to polish a polish target surface by simultaneously using a plurality of automatic polishing devices, and this makes it possible to shorten a time taken to carry out the polishing.

According to the automatic polishing device in accordance with an aspect of the present invention, it is possible to bring about an effect similar to that of the automatic polishing system in accordance with an aspect.

ADDITIONAL REMARKS

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

10: Automatic polishing system
11: Polishing machine
111: Main body
1111: Spindle
112: Polishing tool
12: Sensor
13: Multi-articulated robot
131: First joint
132: First arm
133: Second joint
134: Second arm
135: Third joint
136: Third arm (end part of multi-articulated robot)
14: Camera
15: Control unit
151: Image identifying unit
152: Threshold setting unit
153: Polishing machine control unit
154: Robot control unit
155: Threshold determining unit

The invention claimed is:

1. An automatic polishing system comprising:
an automatic polishing device; and
a control unit,
the automatic polishing device being provided with (1) a multi-articulated robot, (2) a polishing machine which is provided at an end part of the multi-articulated robot and which includes a spindle that spins around an axis and a polishing tool that is fixed at an end of the spindle, and (3) a sensor which is provided between the end part and the polishing machine and which outputs normal reaction force information indicative of normal reaction force that acts from a polish target surface to the polishing machine and torque information indicative of torque that acts around the axis of the spindle, and
the control unit obtaining the normal reaction force information and the torque information to control the multi-articulated robot based on the normal reaction force and the torque, wherein:
the control unit includes a robot control unit and a threshold determining unit,
the robot control unit controlling the multi-articulated robot such that the normal reaction force falls within a predetermined range during a period in which the polishing machine is polishing a polish region that is a predetermined region of the polish target surface, and
the threshold determining unit determining that polishing of the polish region has been completed when the torque is equal to or lower than a predetermined threshold, and wherein:
the polish target surface is a surface of a paint film which covers a body of an automobile;
said automatic polishing system further comprises a camera which outputs image information indicative of an image including the automobile; and
the control unit further includes a threshold setting unit which sets the threshold in accordance with the automobile specified by at least any of a manufacturer, a vehicle type name, and a body color included in the image indicated by the image information, wherein:
the robot control unit controls the multi-articulated robot such that, during the period in which the polishing machine is polishing the polish region, a position of the spindle in the polish target surface draws a cyclic track in which a starting point and an ending point are coincident within the polish region which is the predetermined region; and
the threshold determining unit determines that polishing of the polish region has been completed when a maximum value of the torque in one cycle in which the starting point and the ending point are coincident is equal to or lower than the threshold.

2. The automatic polishing system as set forth in claim 1, wherein:
the sensor is a 6-axis force sensor; and
the control unit controls the multi-articulated robot such that the polishing tool follows the polish target surface in accordance with translation force which acts from the polish target surface to the polishing machine and includes said normal reaction force and with torque which acts from the polish target surface to the polishing machine and includes said torque that acts around the axis of the spindle.

\* \* \* \* \*